(12) United States Patent
Halbig et al.

(10) Patent No.: US 11,901,687 B2
(45) Date of Patent: Feb. 13, 2024

(54) METHOD FOR MANUFACTURING AN ELECTRICAL CONNECTOR FOR A MULTI-WIRE ELECTRICAL CABLE

(71) Applicant: MD ELEKTRONIK GmbH, Waldkraiburg (DE)

(72) Inventors: Thomas Halbig, Dietfurt (DE); Peter Krause, Rattenkirchen (DE)

(73) Assignee: MD ELEKTRONIK GMBH, Waldkraiburg (DE)

( * ) Notice: Subject to any disclaimer, the term of this patent is extended or adjusted under 35 U.S.C. 154(b) by 65 days.

(21) Appl. No.: 17/375,007

(22) Filed: Jul. 14, 2021

(65) Prior Publication Data
US 2022/0029373 A1 Jan. 27, 2022

(30) Foreign Application Priority Data
Jul. 23, 2020 (DE) ...................... 10 2020 119 478.1

(51) Int. Cl.
*H01R 43/24* (2006.01)
*H01R 43/16* (2006.01)
(Continued)

(52) U.S. Cl.
CPC ......... *H01R 43/24* (2013.01); *B29C 45/1418* (2013.01); *H01R 13/405* (2013.01);
(Continued)

(58) Field of Classification Search
CPC ......... B29C 45/1418; B29L 2013/3462; H01R 13/405; H01R 13/65912; H01R 43/16;
(Continued)

(56) References Cited

U.S. PATENT DOCUMENTS 3,611,255 A * 10/1971 Shroyer ................. H01R 13/50
439/282
5,906,513 A * 5/1999 Peterson ............ H01R 13/6593
439/607.58
(Continued)

FOREIGN PATENT DOCUMENTS

DE 102009049132 A1 5/2010
DE 102011084741 B4 11/2013
(Continued)

*Primary Examiner* — Donghai D Nguyen
(74) *Attorney, Agent, or Firm* — LEYDIG, VOIT & MAYER, LTD.

(57) ABSTRACT

A method can be applied for manufacturing an electrical connector on an end portion of a multi-wire electrical cable whose wires are surrounded annularly in cross section in the end portion by an outer conductor. The outer conductor is partially radially compressed toward the wires by at least one die, and is also partially provided with an overmold in an injection mold. In the method, after the outer conductor is deformed, the die is positioned on the outer conductor in such a way that the die partially bounds a mold cavity to be filled with a plasticized molding compound to form the overmold. At least one mold part of the injection mold is moved toward the outer conductor and the mold part is positioned in a vicinity of the outer conductor so to further bound the mold cavity.

20 Claims, 5 Drawing Sheets

(51) Int. Cl.
  *H01R 13/6591* (2011.01)
  *B29C 45/14* (2006.01)
  *H01R 13/405* (2006.01)
  *B29L 31/34* (2006.01)

(52) U.S. Cl.
  CPC ....... *H01R 13/65912* (2020.08); *H01R 43/16* (2013.01); *B29L 2031/3462* (2013.01)

(58) Field of Classification Search
  CPC ............... H01R 43/24; Y10T 29/49176; Y10T 29/49181
  See application file for complete search history.

(56) References Cited

U.S. PATENT DOCUMENTS

| | | | |
|---|---|---|---|
| 8,226,872 B2* | 7/2012 | Cortes Roque | ... B29C 45/14491 264/261 |
| 8,480,421 B2* | 7/2013 | Yoshioka | ............... H01R 43/24 439/275 |
| 9,054,462 B2* | 6/2015 | Nickol | ............. H01R 13/65914 |
| 2009/0186506 A1* | 7/2009 | Chen | ...................... H01R 43/24 29/883 |

FOREIGN PATENT DOCUMENTS

| | | |
|---|---|---|
| DE | 102016215686 A1 | 2/2018 |
| JP | 201222928 A | 2/2012 |
| WO | 2008/115426 A1 * | 9/2008 |

* cited by examiner

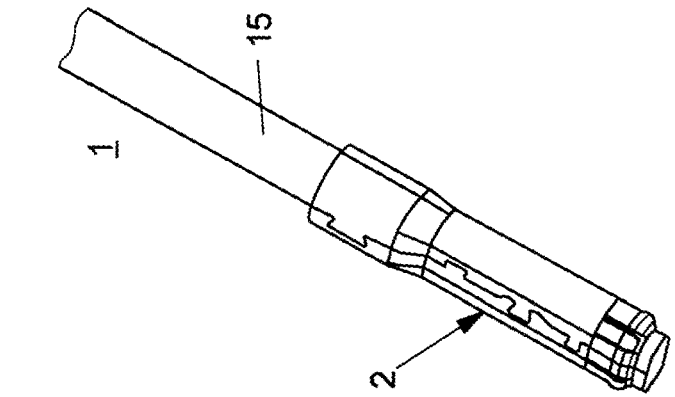
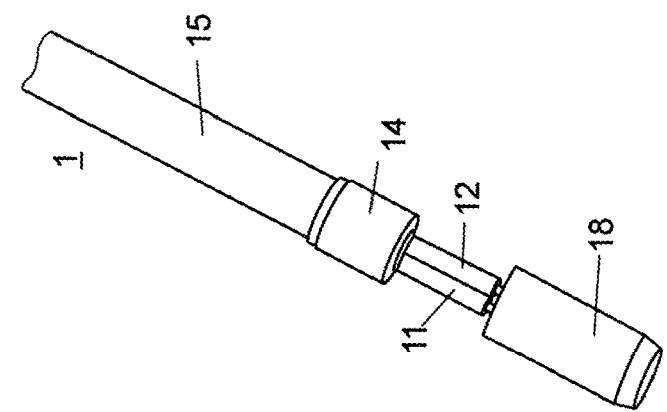
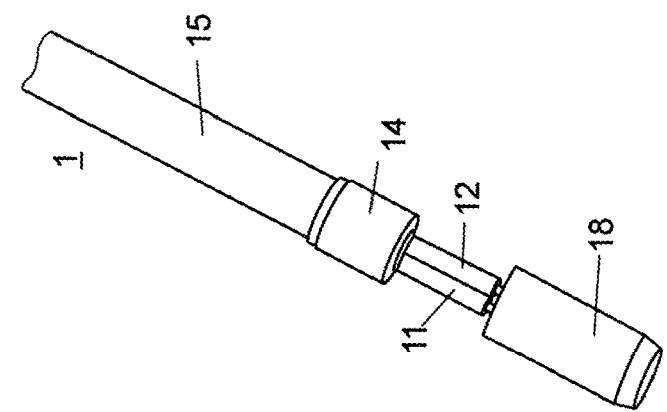
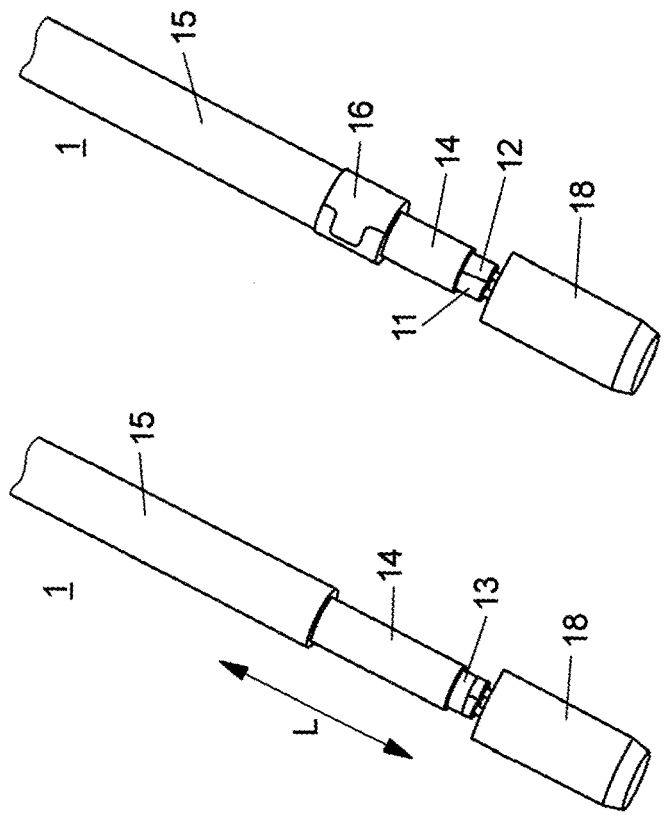

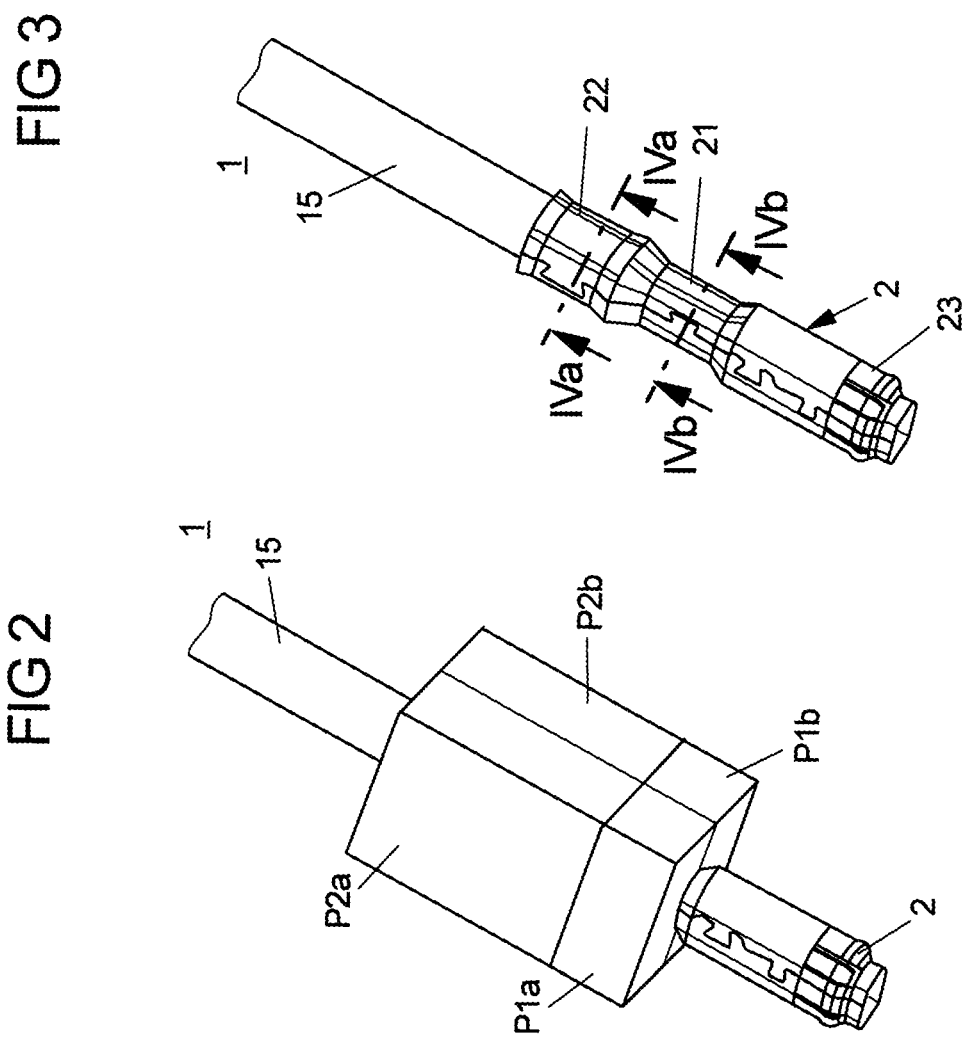
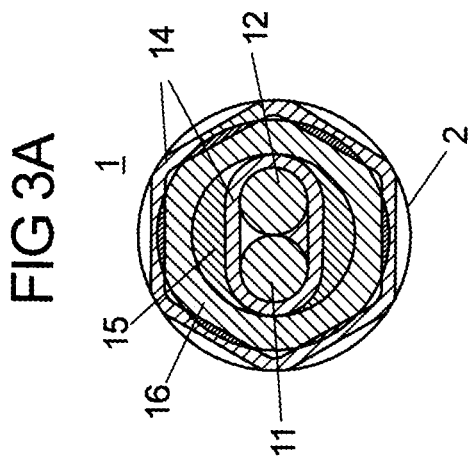
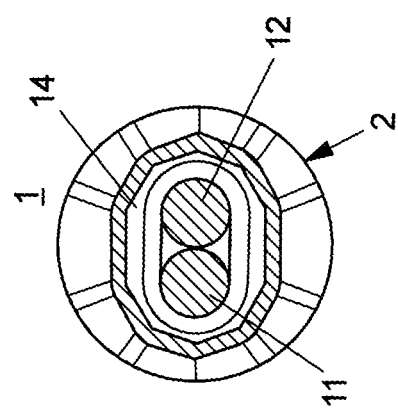

FIG 5
FIG 6
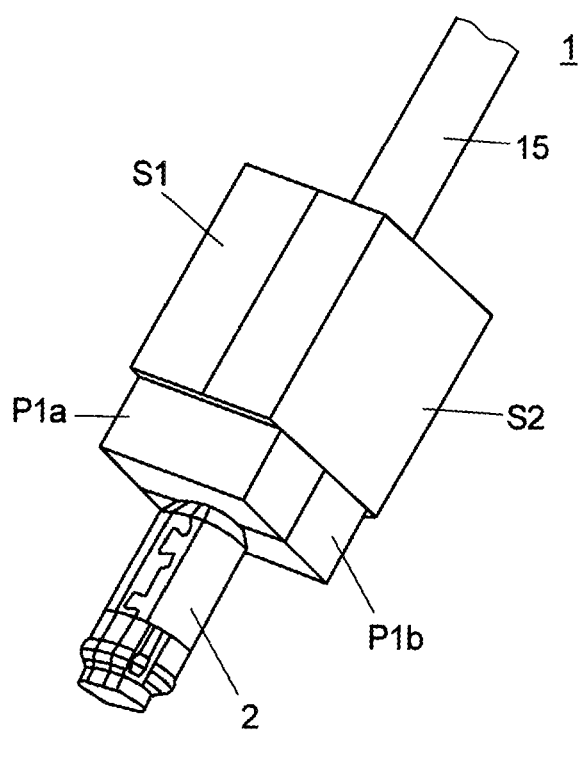
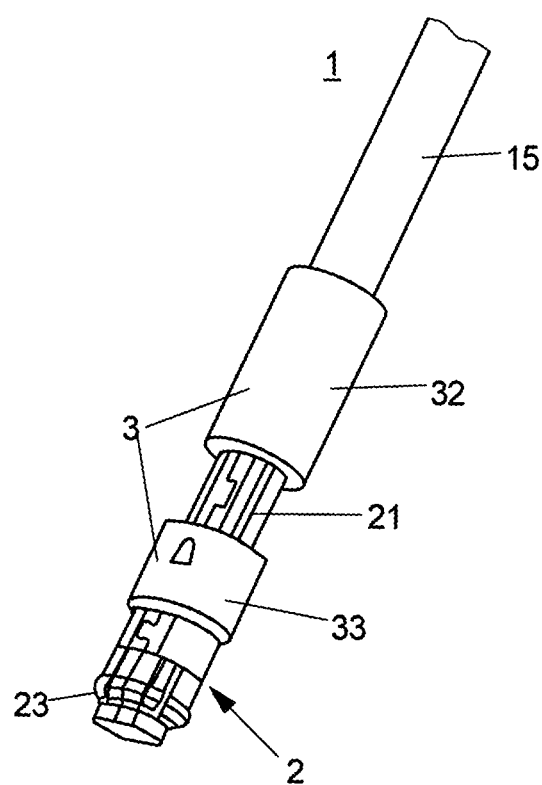

FIG 7
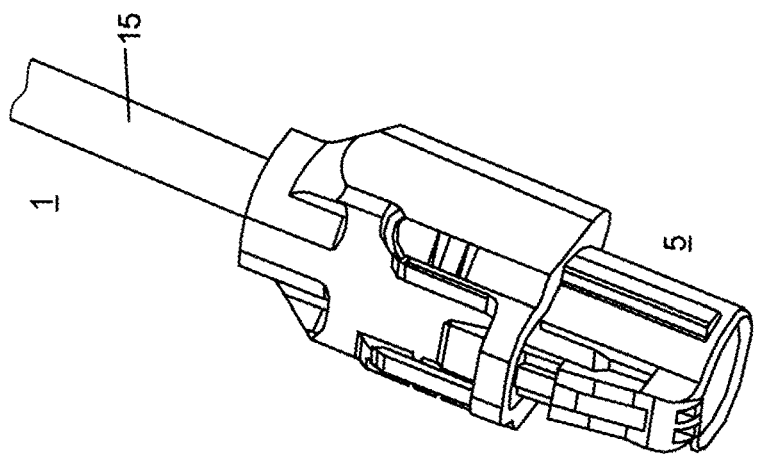
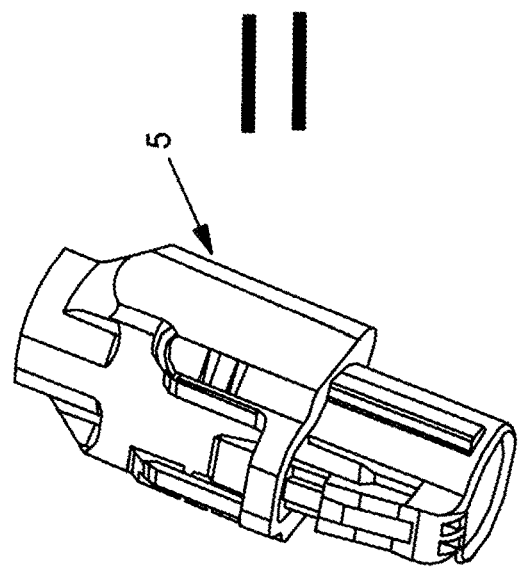
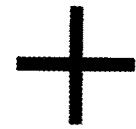
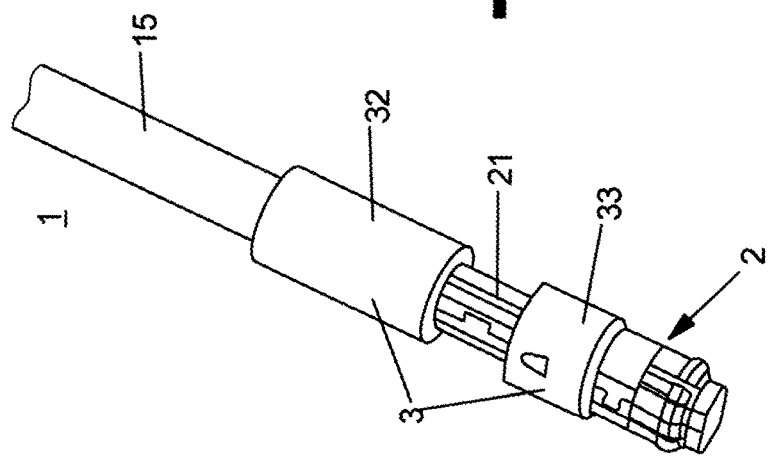

METHOD FOR MANUFACTURING AN ELECTRICAL CONNECTOR FOR A MULTI-WIRE ELECTRICAL CABLE

CROSS REFERENCE TO RELATED APPLICATIONS

This application claims benefit to German Patent Application No. DE 10 2020 119 478.1, filed on Jul. 23, 2020 which is hereby incorporated by reference herein.

FIELD

The invention relates to a method for manufacturing an electrical connector for a multi-wire electrical cable.

BACKGROUND

In the prior art, it is known to provide single- or multi-wire cables with connectors at end portions thereof in order to be able to detachably connect the cables to other connection partners. To this end, components of the connector are often attached to the cable by means of deformation processes, such as stamping or bending processes. In addition, it may be necessary to arrange additional components on the cable using forming processes, such as injection molding. A frequently occurring problem in practice is that a variety of manufacturing machines are necessary for the various processes that are required for the manufacture and mounting of the individual components of the connector. This significantly increases both the complexity and cost of manufacturing.

DE 10 2016215 686 A1 discloses a connector having an insulative body and electrical conductor ends which are connected to plug contacts. The insulative body is formed by an overmolded uniform insulating compound that surrounds the plug contacts and the conductor ends in intimate material-to-material contact therewith. An electrically conductive shielding sleeve is at least partially embedded in the insulating compound of the insulative body in intimate material-to-material contact therewith, the shielding sleeve surrounding the plug contacts and the electrical conductor ends in an electromagnetically shielding manner.

JP 2012-22 928 A discloses a method for producing an inner conductor contact for a connector having an insulator. An inner conductor of a shielded cable is positioned in a crimping region of the inner conductor contact. An inner terminal mold including an upper die and a lower die is mounted on the inner terminal. The crimping region is compressed into contact with the inner conductor of the shielded cable by a concave crimping portion of the upper die and a concave anvil portion of the lower die. Subsequently, an injection chamber is formed around the inner conductor contact and filled with a resin material to form the insulator.

DE 10 2009 049 132 A1 discloses a method for manufacturing a shielded connector disposed on an end of a shielded cable. At least one contact partner connected to an electrical conductor of the cable is disposed in a contact carrier. A sleeve of an electrically conductive material is provided, the sleeve being disposed on a shielding braid of the cable and electrically contacted thereto. Furthermore, a space between the contact carrier and the sleeve is filled with an electrically non-conductive plastic material. An outer sleeve is disposed such that it extends at least partially over the contact carrier, the space and the sleeve, a surface of the sleeve being in contact with an inner portion of the outer sleeve for electrical contacting purposes.

SUMMARY

In an embodiment, the present disclosure provides a method for manufacturing an electrical connector on an end portion of a multi-wire electrical cable whose wires are surrounded annularly in cross section in the end portion by an outer conductor. The outer conductor is partially radially compressed toward the wires by at least one die, and is also partially provided with an overmold in an injection mold. In the method, after the outer conductor is deformed, the at least one die is positioned on the outer conductor in such a way that the at least one die partially bounds a mold cavity to be filled with a plasticized molding compound to form the overmold. At least one mold part of the injection mold is moved toward the outer conductor and the at least one mold part is positioned in a vicinity of the outer conductor so to further bound the mold cavity.

BRIEF DESCRIPTION OF THE DRAWINGS

Subject matter of the present disclosure will be described in even greater detail below based on the exemplary figures. All features described and/or illustrated herein can be used alone or combined in different combinations. The features and advantages of various embodiments will become apparent by reading the following detailed description with reference to the attached drawings, which illustrate the following:

FIG. 1A shows an insert for an injection mold as a starting point for the manufacture of an electrical connector on a multi-wire electrical cable having a shielding braid and a cable jacket;

FIG. 1B shows the insert of FIG. 1A after a first processing step, including placement of a support crimp;

FIG. 1C shows the insert of FIG. 1B after a further processing step, including folding of the shielding braid over onto the support crimp;

FIG. 1D shows the insert of FIG. 1C after yet another processing step, including placement of an outer conductor;

FIG. 2 shows the insert of FIG. 1D together with dies for acting on the insert;

FIG. 3 shows the insert of FIG. 1D after having been acted upon by the dies in accordance with FIG. 2;

FIG. 3A shows a first cross-sectional view of the insert of FIG. 3;

FIG. 3B shows a second cross-sectional view of the insert of FIG. 3;

FIG. 5 shows the assembly of FIG. 4 with the slides in their final position;

FIG. 6 shows the insert of FIG. 3 after it has been partially overmolded in accordance with FIGS. 4 and 5; and FIG. 7 shows the insert of FIG. 6 after insertion into a connector housing.

DETAILED DESCRIPTION

Figure 4:
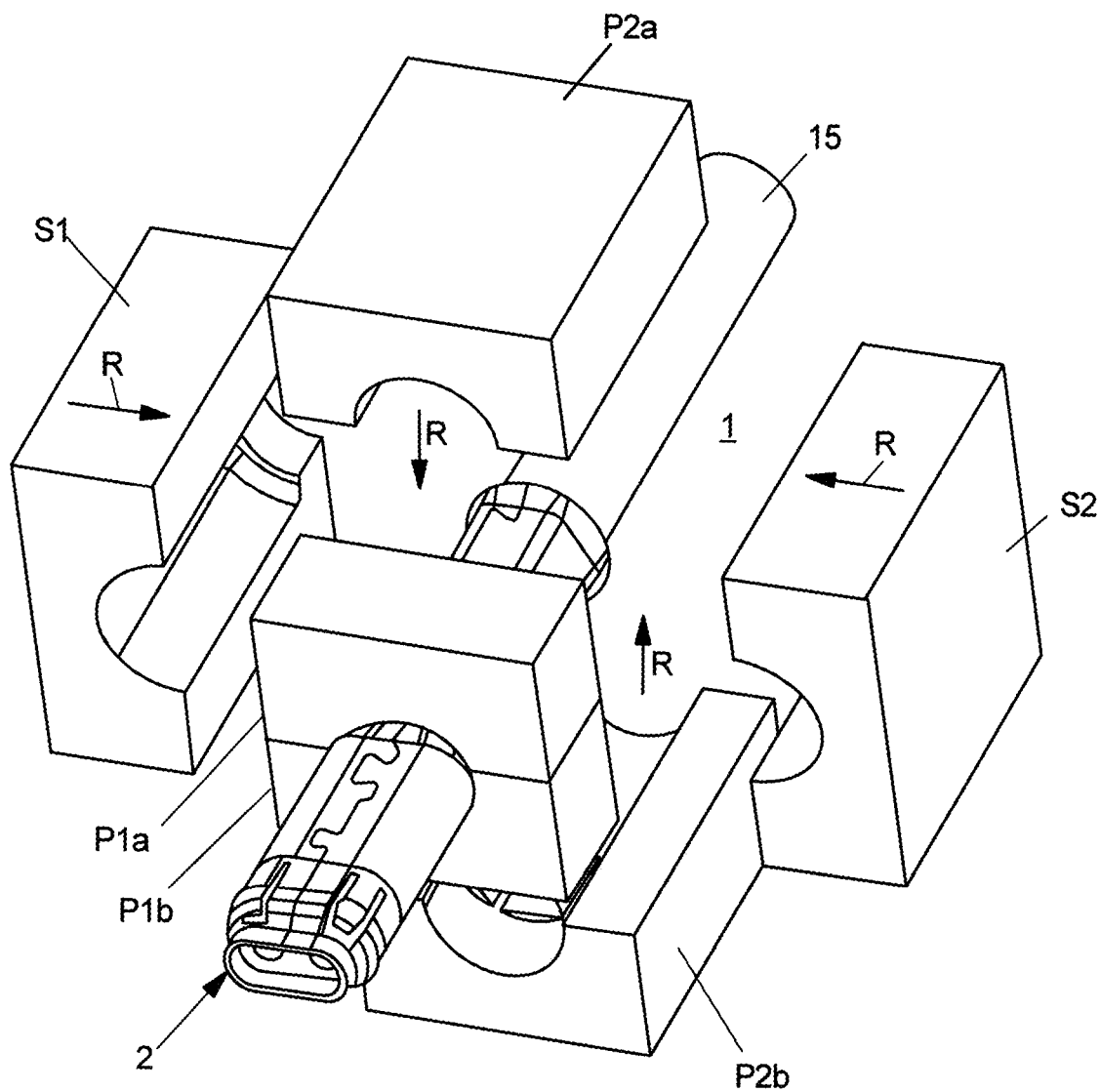
FIG. 4 shows the assembly of FIG. 2 together with slides of an injection mold for bounding a mold cavity in order to partially overmold the insert.

In an embodiment, the present invention improves a method of the above-mentioned type with respect to the manufacturing process.

In an embodiment, the present invention provides a method for manufacturing an electrical connector for a multi-wire electrical cable whose wires are annularly surrounded in cross section by an outer conductor at an end portion of the electrical cable, which end portion is to be provided with the connector. In such a method, the outer conductor is partially radially compressed toward the wires of the cable by at least one (first) die on the one hand, and, on the other hand, is partially provided with an overmold in an injection mold.

Accordingly, in a method of the aforementioned type, it is further provided that, after the outer conductor is deformed, the at least one (first) die be positioned or remain positioned on the outer conductor so that the (first) die partially bounds a mold cavity to be filled with plasticized molding compound to form the overmold of the outer conductor, and that, in order to further bound the mold cavity, at least one mold part of the injection mold be moved toward the outer conductor and positioned in the vicinity thereof, whereupon plasticized molding compound is admitted into the mold cavity.

The approach of embodiments of the invention makes it possible to combine the selective deformation of the outer conductor, for example by means of a stamping and/or bending process, and the overmolding of the outer conductor into a single operation that can be performed within a mold, the at least one (first) die being disposed on, and in particular in that mold.

In this process, after deforming the outer conductor, the at least one die may be positioned or remain positioned in contact with the outer conductor in such a way that the mold cavity is thereby sealed and the plasticized molding compound admitted into the mold cavity does not reach the regions of the outer conductor that are covered by the at least one first die. In other words, the covered region remains free of the plasticized molding compound.

Specifically, the at least one die may act radially on the outer conductor so as to reduce the distance between the wires and the outer conductor in the radial direction.

Advantageously, two first dies each deform the outer conductor radially in different directions so as to compress it toward the wires, these dies acting in particular on the same axial section of the outer conductor. This may mean that the dies are disposed substantially opposite each other in the radial direction.

At least two mold parts may be suitably positioned in the vicinity of the outer conductor so as to bound (together with at least one first die) the mold cavity in which the outer conductor is at least partially overmolded. Each such mold part may be formed by a slide that is movable in a radial direction with respect to the outer conductor so as to bound the mold cavity or to make the mold cavity accessible.

In an embodiment, the electrical cable includes a shield in the region of the connector (to be produced). The shield surrounds the wires of the electrical cable annularly in cross section and may in particular include a shielding braid. Moreover, it may be provided that at least one additional (second) die act on the outer conductor so as to deform the outer conductor in such a way that it is in defined, permanent electrical contact with the shield of the cable. Specifically, two additional, second dies may act on the outer conductor in different directions so as to deform the outer conductor in such a way that it is in electrical contact with the shield of the cable. A respective additional, second die may be disposed on, and in particular in the mold in which the outer conductor of the electrical cable is provided with an overmold.

In an embodiment of the method, in the region where the shield of the cable is brought into electrical contact with the outer conductor by deformation of the latter, the shield may be supported on a supporting element that annularly encompasses the wires. This may be achieved, for example, by folding the shield of the cable over onto the supporting element.

In accordance with an embodiment of the inventive method, after the outer conductor is deformed, the at least one additional, second die is removed from the electrical cable, and the at least one mold part is positioned in its place on the electrical cable so as to form the mold cavity in which the outer conductor is at least partially overmolded by admission or injection of a molding compound (and which mold cavity is additionally sealed or bounded by the at least one first die). This means that by removing the at least one additional (second) die from the electrical cable, the aforesaid mold cavity can now be selectively bounded by suitable mold parts of the injection mold. In other words, removal of the at least one additional (second) die from the electrical cable clears the space that is subsequently defined as the mold cavity by means of the at least one mold part.

Another embodiment of the present invention further provides an electrical connector manufactured using the method according to an embodiment of the invention.

FIG. 1A shows a portion of a multi-wire electrical cable 1. This portion is an axial end portion of cable 1, which is to be subjected to further processing to form an electrical connector and which is also referred to as "insert" herein. In the exemplary embodiment, electrical cable 1 takes form of a two-wire electrical cable. The two wires 11, 12 of cable 1 extend side by side along longitudinal cable direction L, forming parallel wires when the cable is extended. Wires 11, 12 each include, for example, an electrical conductor and an insulating sheath surrounding the respective conductor.

Wires 11, 12 of electrical cable 1 are arranged together within a cable interior which is enclosed annularly in cross section by a cable jacket 15 extending in longitudinal cable direction L. Cable jacket 15 is composed of an electrically insulating material.

Moreover, a cable shield 13, 14 surrounding wires 11, 12 and extending along longitudinal cable direction L is disposed between cable jacket 15 and the cable interior, which serves to receive wires 11, 12. The cable shield may be formed, for example, by a shielding braid or a foil, or by a shielding braid in combination with a foil. The latter variant is shown in FIG. 1A, where the supplementary shielding foil 13 is attached to the inner surface of shielding braid 14, which faces the wires 11, 12.

Cable shield 13, 14 serves to electrically shield the interior of the cable and for this purpose includes a metallic material, such as, for example, aluminum. The shielding foil 13 used may be a plastic film that is coated with an electrically conductive material, such as aluminum, in particular on its inner surface facing the interior of the cable.

Metallic shielding braids are used primarily for shielding in the case of relatively low frequencies, while cable shields in the form of metallic foils or metal-coated films are used for shielding in the case of relatively high frequencies (1 MHz to 10 GHz).

Cable shield 13, 14 and cable jacket 15 may be combined into one unit, for example by bonding the outer surface of cable shield 13, 14, which faces away from wires 11, 12, to cable jacket 15, for example by an adhesive.

In the configuration shown in FIG. 1A, electrical cable 1 is partially freed from cable jacket 15 at its axial end portion where the connector is to be formed, so that cable shield 14, or its shielding braid 14, forms the outer surface of the electrical cable there. Furthermore, in the exemplary embodiment, electrical cable 1 is covered at its free end by an insulating sleeve 18, which is spaced apart from cable jacket 15 along longitudinal cable direction L. As a result, a region where shielding braid 14 forms the outer surface of electrical cable 1 exists between cable jacket 15 and insulating sleeve 18 along longitudinal cable direction L.

According to FIG. 1B, a support crimp 16 is placed on electrical cable 1 or, more precisely, on its axial end portion (insert) in such a way that support crimp 16 is adjoined by a region of electrical cable 1 where shielding braid 14 is not surrounded by cable jacket 15; i.e., where it forms the outer surface of electrical cable 1. In the exemplary embodiment, support crimp 16 is inwardly placed partially on shielding braid 14 and partially on cable jacket 15.

According to FIG. 1C, cable shield 14, or more specifically in the exemplary embodiment, its exposed shielding braid 14 is then folded back so that it covers support crimp 16 on the outer surface facing away from wires 11, 12. As a further result, the support crimp 16 covered by the folded-back shielding braid 14 is axially adjoined on one side, namely toward the free end of cable 1 or insulating sleeve 18, by the exposed wires 11, 12 of cable 1 and, on the other side, by a cable portion that is enclosed by cable jacket 15.

Finally, as illustrated in FIG. 1D, an outer conductor 2 is placed on the axial end portion of electrical cable 1. In the exemplary embodiment, outer conductor 2 takes the form of an outer tube and is composed of an electrically conductive material and surrounds the end portion annularly or, more specifically in the exemplary embodiment, circularly in cross section. Outer conductor 2 extends along a longitudinal direction (longitudinal cable direction L); i.e., axially, from a first, cable-side end section 22 to a second, output-side end section 23, the end sections being disposed on both sides of a central section 21 of outer conductor 2.

Outer conductor 2 covers support crimp 16 as well as the portion of shielding braid 14 that is folded back thereon. Furthermore, in the exemplary embodiment, outer conductor 2 covers in particular the region of the end portion of electrical cable 1 where wires 11, 12 are exposed; i.e., not surrounded by other components of electrical cable 1, and possibly a portion of cable jacket 15 (adjoining support crimp 16) and/or (partially) the insulating sleeve 18.

The so-prepared end portion of electrical cable 1 is deformed in the region of outer conductor 2 by at least one die (pressing die P1*a*, P1*b*; P2*a*, P2*b*), that deforms or, more specifically, locally compresses outer conductor 2 radially from the outside. In the exemplary embodiment of FIG. 2, the deformation is accomplished by dies P1*a*, P1*b*; P2*a*, P2*b*, the respective pairs of which deform outer conductor 2 radially along different directions, in particular along opposite directions.

Specifically, in the present case, the deformation occurs at two locations on the axial end portion of electrical cable 1 or outer conductor 2, the two locations being axially spaced apart along longitudinal cable direction L, and at these locations in particular by means of a respective pair of dies P1*a*, P1*b* or P2*a*, P2*b*.

The die or dies P1*a*, P1*b* or P2*a*, P2*b* may be provided (as a pressing die or pressing dies) on or, more specifically, in an injection mold into which the axial end portion of electrical cable 1 is placed as an insert and in which that axial end portion is to be subsequently (partially) overmolded.

The deformation of outer conductor 2 by means of a respective die P1*a*, P1*b* or P2*a*, P2*b* may be performed in particular after outer conductor 2 is placed as a component of electrical cable 1 into an (injection) mold in which outer conductor 2 is to be provided with an overmold.

In a first axial section of outer conductor 2 (central section 21), the radial deformation by at least one first die or, more specifically, by two first dies P1*a*, P1*b* is performed to reduce the radial distance between outer conductor 2 and wires 11, 12 of electrical cable 1 by inwardly compressing and thereby deforming the aforesaid section 21 of outer conductor 2, as illustrated in FIGS. 3 and 3*b*, which makes it possible to improve the characteristic impedance. In that section 21 of outer conductor 2, wires 11, 12 of electrical cable 1 are exposed in so far as they are surrounded exclusively and directly by outer conductor 2, but not by cable shield 13, 14 or support crimp 16.

At another, second axial section of outer conductor 2 (cable-side end section 22), the radial deformation by at least one second die or, more specifically, by two second dies P2*a*, P2*b* is performed to produce a defined electrical connection to the (folded-back) shielding braid 14; i.e., to establish a "connection to ground," and/or to provide a strain relief by inwardly compressing and thereby deforming the aforesaid section 21 of outer conductor 2, as illustrated in FIGS. 3 and 3*b*, whereby it is radially compressed against shielding braid 14 and possibly against cable jacket 15.

As shown in FIGS. 4 and 5, the dies P2*a*, P2*b* of the second pair of dies are then removed in radial direction R from outer conductor 2 and, in place thereof, at least one slide S1, S2 or, more specifically, a pair of slides S1, S2 of the injection mold is approached (in radial direction R) to outer conductor 2 and positioned in the vicinity thereof so as to thereby create a mold cavity which is bounded by slides S1, S2 and which is filled with a plasticized molding compound to overmold the end portion of electrical cable 1 (insert) placed into the injection mold or, more specifically, its outer conductor 2, and possibly a portion of cable jacket 15, with the molding compound, e.g., plasticized plastic material, thereby forming a corresponding overmold 32 over a certain length, as illustrated in FIG. 6.

The overmold 32 formed over a certain length may connect cable jacket 15 to a section (end section 22) of outer conductor 2 that is compressed against support crimp 16 and may thereby serve to relieve the strain on electrical cable 1 and, in particular, on cable jacket 15.

During the injection molding process described, the at least one first die or the dies P1*a*, P1*b* of the first pair of dies remain(s) on electrical cable 1 or, more precisely, on outer conductor 2 and may thus contribute to the lateral bounding and, in particular, sealing of the mold cavity, so that no plasticized molding compound will get on the thereby covered regions of outer conductor 2, as can be seen from the non-overmolded central region of outer conductor 2 (at reference numeral 21 in FIG. 6).

As is further apparent from FIG. 6, a further partial overmold 33 may additionally be provided on outer conductor 2 on the side of first dies P1*a*, P1*b* opposite the slides S1, S2; i.e., on its output-side end section 23. During the formation of overmold 33, first dies P1*a*, P1*b* may again serve to (laterally) bound and possibly seal the corresponding mold cavity. The further overmold 33 may serve, for example, for the attachment of mechanical elements and may in particular be formed with a locking element, such as a locking hook, for securing a connector housing in place. This results in an overmold 3 on outer conductor 2, which is formed of several partial overmolds 32, 33.

Finally, a connector housing 5 is slid onto the appropriately prepared axial end portion of electrical cable 1, as illustrated in FIG. 7, and fixedly secured thereto, for example, by means of a locking hook provided on the axial end portion of electrical cable 1.

While subject matter of the present disclosure has been illustrated and described in detail in the drawings and foregoing description, such illustration and description are to be considered illustrative or exemplary and not restrictive. Any statement made herein characterizing the invention is also to be considered illustrative or exemplary and not restrictive as the invention is defined by the claims. It will be understood that changes and modifications may be made, by those of ordinary skill in the art, within the scope of the following claims, which may include any combination of features from different embodiments described above.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

What is claimed is:

1. A method for manufacturing an electrical connector on an end portion of a multi-wire electrical cable whose wires are surrounded annularly in cross section in the end portion by an outer conductor, the outer conductor being partially radially compressed toward the wires by at least one die, and being partially provided with an overmold in an injection mold, the method comprising:
   after the outer conductor is deformed, positioning the at least one die on the outer conductor in such a way that the at least one die partially bounds a mold cavity to be filled with a plasticized molding compound to form the overmold; and
   moving at least one mold part of the injection mold toward the outer conductor and positioning the at least one mold part in a vicinity of the outer conductor so as to further bound the mold cavity.

2. The method as recited in claim 1, wherein, after the outer conductor is deformed, the at least one die is positioned on the outer conductor in such a way that the mold cavity is sealed and a region of the outer conductor that is covered by the at least one die remains free of the plasticized molding compound introduced into the mold cavity.

3. The method as recited in claim 1, wherein the at least one die radially deforms the outer conductor so as to reduce the distance between the wires and the outer conductor in the radial direction.

4. The method as recited in claim 1, wherein the at least one die is disposed on the injection mold so that the end portion of the electrical cable is placed on the injection mold before the at least one die deforms the outer conductor.

5. The method as recited in claim 1, wherein at least two mold parts are positioned in the vicinity of the outer conductor in such a way that the mold parts and the at least one die together bound the mold cavity.

6. The method as recited in claim 1, wherein the at least one mold part is formed by a slide that is movable in the radial direction with respect to the outer conductor so as to bound the mold cavity or to make the mold cavity accessible.

7. The method as recited in claim 1, wherein the electrical cable has a shield in a region of the connector, the shield surrounding the wires of the electrical cable, and wherein at least one additional die deforms the outer conductor so as to deform the outer conductor in such a way that the outer conductor is in electrical contact with the shield.

8. The method as recited in claim 7, wherein two additional dies deform the outer conductor in different directions so as to deform the outer conductor in such a way that the outer conductor is in electrical contact with the shield of the cable.

9. The method as recited in claim 7, wherein, in the region where the shield is in electrical contact with the outer conductor by deformation of the outer conductor, the shield of the cable is supported on a supporting element that annularly encompasses the wires, and the shield is folded over onto the supporting element.

10. The method as recited in claim 7, wherein, after the outer conductor is deformed, the at least one additional die is removed from the electrical cable, and wherein the at least one mold part is positioned in its place on the electrical cable so as to form a mold cavity which is additionally sealed and/or bounded by the at least one die.

11. An electrical connector manufactured in accordance with claim 1.

12. The method as recited in claim 1, further comprising sliding a connector housing on the end portion of the electrical cable.

13. The method as recited in claim 12, wherein the connector housing is secured to a further overmold.

14. The method as recited in claim 13, wherein the further overmold is produced in a further mold cavity that is laterally bounded by the at least one die such that the further overmold is axially separated from the overmold.

15. The method as recited in claim 14, wherein the outer conductor is radially compressed and not overmolded in a region between the between the overmold and the further overmold.

16. The method as recited in claim 1, wherein the mold cavity is bounded laterally at one end by the at least one die and is bounded laterally at the other end by the at least one mold part.

17. The method as recited in claim 16, wherein the outer conductor is deformed at a first axial location by radially compressing the outer conductor by the at least one die, and at a second axial location by radially compressing the outer conductor by at least one additional die, and wherein, after the outer conductor is deformed at the second axial location, the at least one additional die is moved away from the electrical cable and the at least one mold part is moved into the vicinity of the outer conductor so as to laterally bound the other end of the mold cavity.

18. The method as recited in claim 1, further comprising injecting the plasticized molding component into the mold cavity so as to form the overmold, wherein the mold cavity is surrounded radially by the injection mold, and is sealed laterally at one end by the at least one die and is sealed laterally at the other end by the at least one mold part.

19. The method as recited in claim 1, wherein the outer conductor surrounds a cable shield, which surrounds the wires of the electrical cable, along at least one section of the end portion of the electrical cable, and wherein the outer conductor is radially compressed against the wires in another section of the end portion of the electrical cable that does not include the cable shield.

20. The method as recited in claim 1, wherein the overmold extends along the end section of the electrical cable to surround the outer conductor along a portion of the length of the outer conductor and to surround a cable jacket of the electrical cable along a portion of the electrical cable adjacent to the outer conductor.

* * * * *